US005608873A

United States Patent [19]
Feemster et al.

[11] Patent Number: 5,608,873
[45] Date of Patent: Mar. 4, 1997

[54] DEVICE AND METHOD FOR INTERPROCESSOR COMMUNICATION USING MAILBOXES OWNED BY PROCESSOR DEVICES

[75] Inventors: Ryan Feemster; David Dettmer, both of Austin, Tex.

[73] Assignee: Advanced Micro Devices, Inc., Sunnyvale, Calif.

[21] Appl. No.: 675,217

[22] Filed: Jul. 3, 1996

Related U.S. Application Data

[63] Continuation of Ser. No. 113,299, Aug. 30, 1993, abandoned.

[51] Int. Cl.⁶ .................................................... G06F 13/14
[52] U.S. Cl. ....................................................... 395/200.08
[58] Field of Search ........................ 364/DIG. 1 MS File, 364/DIG. 2 MS File; 395/200.1, 200.2, 200.07, 200.08, 650

[56] References Cited

U.S. PATENT DOCUMENTS

| | | | |
|---|---|---|---|
| 4,665,482 | 5/1987 | Murray, Jr. et al. | 364/200 |
| 4,760,521 | 7/1988 | Rehwald et al. | 364/200 |
| 4,862,354 | 8/1989 | Fiacconi et al. | 364/200 |
| 4,873,476 | 10/1989 | Kurakake | 318/568.22 |
| 4,879,642 | 11/1989 | Malka et al. | 364/131 |
| 4,965,707 | 10/1990 | Cutts, Jr. et al. | 364/200 |
| 4,970,447 | 11/1990 | Kamiguchi et al. | 318/567 |
| 5,038,276 | 8/1991 | Bozzetti et al. | 364/200 |
| 5,072,373 | 12/1991 | Dann | 395/200 |
| 5,127,089 | 6/1992 | Gay et al. | 395/325 |
| 5,136,714 | 8/1992 | Braudeway et al. | 395/725 |
| 5,142,683 | 8/1992 | Burkhardt, Jr. et al. | 395/725 |
| 5,142,689 | 8/1992 | Eisenack | 395/800 |
| 5,146,596 | 9/1992 | Whittaker et al. | 395/725 |
| 5,161,209 | 11/1992 | Nagai et al. | 388/907.5 |
| 5,187,796 | 2/1993 | Wang | 395/800 |
| 5,193,197 | 3/1993 | Thacker | 395/725 |
| 5,202,966 | 4/1993 | Woodson | 395/325 |
| 5,271,020 | 12/1993 | Marisetty | 371/30 |
| 5,319,753 | 6/1994 | MacKenna et al. | 395/275 |

FOREIGN PATENT DOCUMENTS

| | | |
|---|---|---|
| 0156921 | 10/1985 | European Pat. Off. . |
| 0218036 | 4/1987 | European Pat. Off. . |
| 0368655 | 5/1990 | European Pat. Off. . |
| 0376003 | 7/1990 | European Pat. Off. . |
| 2256290 | 12/1992 | United Kingdom . |
| 88/02149 | 3/1988 | WIPO . |

OTHER PUBLICATIONS

M. Al–Mouhamed, "Multiprocessor System for Realtime Robotics", vol. 14, No. 5 pp. 276–290, Jun. 5, 1990, London, GB.
M. Kircanski, "Multiprocessor Control System for Industrial Robots", Robotics and Computer Integrated Manufacturing, 1991, vol. 8 No. 2.
M. Kametani et al., "Design Concept for a Robot Controller", Manufacturing Technology International, 1991, pp. 255–256, 258, 260.
J. I. Robla et al. "Hierarchical Architecture for Control System with Robots", Eusipco Sep. 1988 vol. 2.
"Multiple Digital Signal Processor Circuit Cards for Tool Control", *IBM Technical Bulletin*, v. 32, No. 5A Oct. 1989, pp. 452–454.
S. Hasegawa et al. "Fast Access Control of the Heat Positioning Using a Digital Signal Processor", *SPIE Storage and retrieval Systems and Applications*, v. 1248, Japan 1990.

*Primary Examiner*—Robert B. Harrell
*Attorney, Agent, or Firm*—Foley & Lardner

[57] ABSTRACT

A device and method for providing inter-processor communication in a multi-processor architecture. A post office RAM has a plurality of mailboxes. Each mailbox is write-accessible by one port, but is read-accessible by the other ports. Thus, a processor device on a port has write-access to one mailbox, but can read the other mailboxes in the post office. A transmitting processor communicates with a receiving processor, by utilizing the post office. The transmitting processor writes information into its own mailbox, and signals a receiving processor. The receiving processor determines which of the processor devices signalled it, and reads the information in the transmitting processor's mailbox.

23 Claims, 16 Drawing Sheets

DEVICE AND METHOD FOR INTERPROCESSOR COMMUNICATION USING MAILBOXES OWNED BY PROCESSOR DEVICES

This application is a continuation of U.S. application Ser. No. 08/113,299, filed Aug. 30, 1993, now abandoned.

BACKGROUND OF THE INVENTION

1. Field of the Invention

The invention pertains generally to inter-processor communication, and, more particularly, to inter-processor communication via mailboxes.

2. Related Art

A processor device in a multi-processor system architecture needs a capability of transferring information to the other processor devices in the system. Various inter-processor communication approaches have been used, with varying degrees of success.

One such approach utilizes a central memory for storing the information to be transferred. Each processor device has read-access and write-access to the central memory via a bus. Bus arbitration logic is used to allow each processor device read-access and write-access to the memory without bus collision or contention. Typically, the central memory is random access memory (RAM), used for storing the information which is passed between the processors.

Unfortunately, such approaches are costly, since they center around the combination of the central Ram to store the information and complex bus arbitration logic to provide each processor device both read-access and write-access to the Ram without bus collision or contention.

One example of the approach is Burkhardt, Jr., et al., "Intercomputer Communication Control Apparatus and Method", U.S. Pat. No. 5,142,683, which discloses a mailbox communication method and apparatus in which multiple processors have access to a common memory. A processor desiring to send a message to another processor inserts the message into its own mailbox, along with the address of the other processor. The sending processor interrupts the receiving processor, which, in response to the interrupt, scans the mailboxes to find the mailbox containing receiving processor's address and reads the message. Since the processors access common memory via a common work station bus, one disadvantage is that overhead is required to deal with bus contention and collision. Moreover, Burkhardt has another disadvantage, since communication paths may be tied up unless processors copy and clear mailbox information quickly.

An example of a shared common mailbox is found in Murray, Jr. et al,. "Data Multiplex Control Facility", U.S. Pat. No. 4,665,482, which discloses use of a mailbox between a CPU and an I/O microprocessor. Another example of a mailbox, which does not alleviate the disadvantages, is shown in Fiacconi, "Multiprocessor System with Interrupt and Verification Unit", U.S. Pat. No. 4,862, 354.

Another approach that avoids bus collision or contention employs commonly available dual-port RAMs. Such RAMs incorporate RAM cells as well as 2-bus arbitration logic on a single chip, and allow both processor devices read-access and write-access to all RAM cells. In conventional dual-port RAM implementations, read information and write information is stored in the same RAM location. Thus, a way must be provided to prevent the write information from overwriting the read information. Using a dual-port RAM approach, when a sending processor device has information to be sent to a receiving processor, the sending processor device must first check to determine if the receiving processor device has written information to the RAM. If the receiving processor device has written information to theRAM, then the sending processor device must read the RAM before writing the information to be sent to the receiving processor device. The checking which is necessary in this approach unfortunately decreases the possible speed of the inter-processor communication.

This approach becomes increasingly costly and impractical as the number of processor devices in the system increases. For instance, with four processor devices in the system, a total of six dual-port RAMS would be needed to provide communication between each processor. As the number of processor devices in a system increases, the practicality and usefulness of this approach declines.

SUMMARY AND OBJECTS OF THE INVENTION

It is therefore an object of the invention to provide improved information transfer between processor devices in a multi-processor system.

A further object of this invention is to enhance inter-processor communication speed.

Yet another object of this invention is to provide inter-processor communication wherein information sent by one processor device can be ignored by the receiving processor device without tying up communication paths.

A feature of this invention is that it provides interprocessor communication in a multi-processor environment via a post office RAM, which allows each processor device read-access to mailboxes belonging to other processor devices, and write-access to its own mailbox, eliminating the need for complex bus arbitration logic.

It is a further feature of this invention that the need for checking before writing is eliminated, providing for greater flexibility and speed.

It is an advantage of the invention that a receiving processor can override a sending processor, for example, when the sending processor is executing erroneously or when the receiving processor is performing a time-critical task which should not be interrupted.

It another advantage of the invention that it allows asynchronous as well as simultaneous information transfer between processor devices.

It is a further advantage of the invention that the number of processor devices can be increased without adversely affecting cost and performance.

Yet another advantage of the invention is that each processor device can communicate at its own speed without slowing down the other processor devices.

Another advantage of the invention is that it also allows for smaller die sizes compared to conventional dual port RAM techniques.

These and other objects of the invention are accomplished by providing an apparatus for communication between processor devices. The apparatus comprises a post office including a plurality of mailboxes. Each of the mailboxes is owned by a processor device, and read-accessible by the other processor devices.

In accordance with a further preferred embodiment of the invention, there is provided a method of communication among a plurality of processor devices, including a transmitting processor and a receiving processor. A post office with a plurality of mailboxes is utilized. A transmitting processor writes information into a predetermined one of the mailboxes in the post office. The transmitting processor signals a receiving processor. The receiving processor determines which of the processor devices signalled it. The receiving processor reads the information in the predetermined mailbox.

BRIEF DESCRIPTION OF THE DRAWINGS

An exemplary embodiment of the invention is illustrated in the drawings and described in detail below.

In the drawings.

DETAILED DESCRIPTION OF THE PREFERRED EMBODIMENTS

Figure 1:
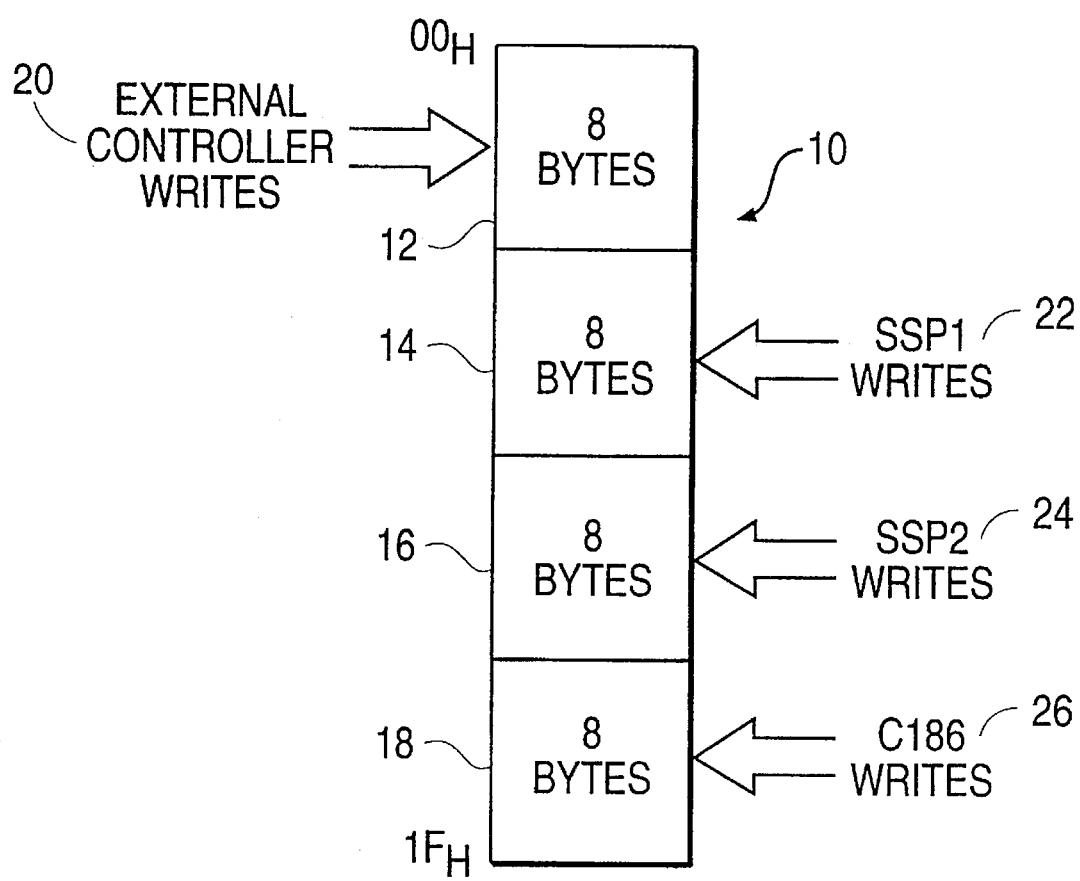
FIG. 1 is a simplified block diagram of a post office RAM.

FIG. 1 illustrates the general structure of the post office RAM 10. The post office RAM conveniently comprises a contiguous block of RAM. The block need not be contiguous; however, this is a practical implementation. The contiguous block of RAM includes a plurality of mailboxes 12, 14, 16, 18. The mailboxes 12, 14, 16, 18 are used to transfer information between the processor devices 20, 22, 24, 26 in a multi-processor system architecture.

In the embodiment shown in FIG. 1, by way of illustration and not limitation, there are four processor devices 20, 22, 24, 26, and correspondingly four mailboxes 12, 14, 16, 18. Each mailbox 12, 14, 16, 18 may advantageously be eight contiguous bytes. The mailbox 12, 14, 16, 18 could be larger or smaller; the object is to obtain as much memory as practical without adversely impacting the die size. In any implementation, the desired area for memory must be balanced against the impact on the die size. Eight bytes is the favored balance for this implementation.

Each of the mailboxes 12, 14, 16, 18 is owned by one of the processor devices 20, 22, 24, 26, termed an owner. The owner of a mailbox is allowed write-access to its own mailbox. All other processor devices are allowed read-access to the mailbox. For example, a first mailbox 12 is owned by an external controller 20. The external controller 20 is the only device which has write-access to the first mailbox 12. The other processor devices, a streamlined signal processor 1 (SSP1) 22, a streamlined signal processor 2 (SSP2) 24, and a microprocessor 26, have read-access to the first mailbox 12 but may not write to mailbox 12. The owner of the mailbox may also have read-access to its own mailbox.

Assume that one processor device, termed a transmitting processor, wishes to transfer data to another processor device, termed a receiving processor. The transmitting processor writes information to its own mailbox. The transmitting processor signals the receiving processor to read the transmitting processor's mailbox. The receiving processor may then read the transmitting processor's mailbox.

Write-arbitration is maintained by permitting write-access to a mailbox by its owner, and prohibiting write-access to a mailbox by a processor device other than the mailbox's owner. In the illustrated implementation, one of the processor devices is an external control device 20. If, for example, the external control device 20 attempts a write-access to any mailbox of which it is not the owner, the write-access will be ignored by the mailbox. This may be implemented in the internal circuitry of the post office RAM. In this way, write-arbitration of the post office RAM is maintained without the usual latency and overhead associated with typical bus arbitration logic.

As can be seen from the above description, when two processor devices have information to transmit to each other, each writes the information to its own mailbox. Thus, a write-access by a first processor device followed by a write-access by a second processor device take place in separate mailboxes. Therefore, a bi-directional transfer, wherein two processor devices write transfer information to each other, can take place without concern about overwriting information.

In the implementation illustrated in FIG. 1, the post office RAM 10 includes a multi-port RAM with a plurality of cells and a plurality of ports. The RAM is partitioned so that each processor device has a unique area of RAM to which it writes(its own mailbox), and therefore no write contention with another processor device is possible. Each cell is write-accessible by one of the ports. Each cell, however, is read-accessible by all ports. Each port is utilized by one processor device. The bi-directional transfer of information between two processor devices takes place in the two different mailboxes owned by the two processor devices, each mailbox being a cell of the RAM. Each mailbox is allowed to be written by its owner. Information transmitted by one processor device is written to one cell of the RAM, and information received by that same processor is read from another cell of the RAM. Therefore, complex bus arbitration logic, which is ordinarily required to prevent write contention and to synchronize multiple processor device's write-accesses, is completely eliminated.

Since each location of the post office RAM need not be write-accessible by every processor device, die savings are realized. The resulting die size is smaller.

Moreover, since each processor device owns its own mailbox, the processor devices can send information to each other without the latency required by typical dual-port RAM implementations, in which the read information and write information to be transferred is stored in the same RAM locations. No checking before writing is required to see if data in the RAM will be improperly overwritten. Nearly instantaneous bi-directional communication is thus achieved between the processor devices. Inter-processor speed improvements are achieved over the traditional dual-port RAM approach.

Furthermore, simultaneous data transfer between multiple processor devices in the system is permitted. For example, the external controller 20 can write-access its own mailbox 12 at the same time that the other processor devices 22, 24 and 26 write-access their own mailboxes 14, 16, 18.

Moreover, asynchronous data transfer between the processor devices is allowed. When the transmitting processor is writing the information into its own mailbox, the receiving processor may be executing some totally unrelated instructions at the same time. Later, the receiving processor may execute instructions which are related to information written by the transmitting processor. As a result, each processor device can communicate without regard to the speed of the other processor devices.

Additionally, information which is written into the mailbox of the post office RAM by a transmitting processor can be ignored by the intended receiving processor without causing a system crash or a communication bottleneck. A system crash or communication bottleneck would deleteriously affect the other processor devices in the system. Nevertheless, in the post office RAM, a receiving processor may override the transmitting processor by ignoring the information. This is useful in situations such as erroneous execution by the transmitting processor, or performance by the intended receiving processor of a time-critical task which cannot be interrupted.

The implementation of the post office RAM, shown here for four processor devices, can be expanded to handle additional processor devices. Also, a mailbox, here illustrated as eight bytes, can be expanded or reduced. The post office RAM can be reduced to handle fewer processor devices, if desired. The principles described herein still apply.

Figure 2:
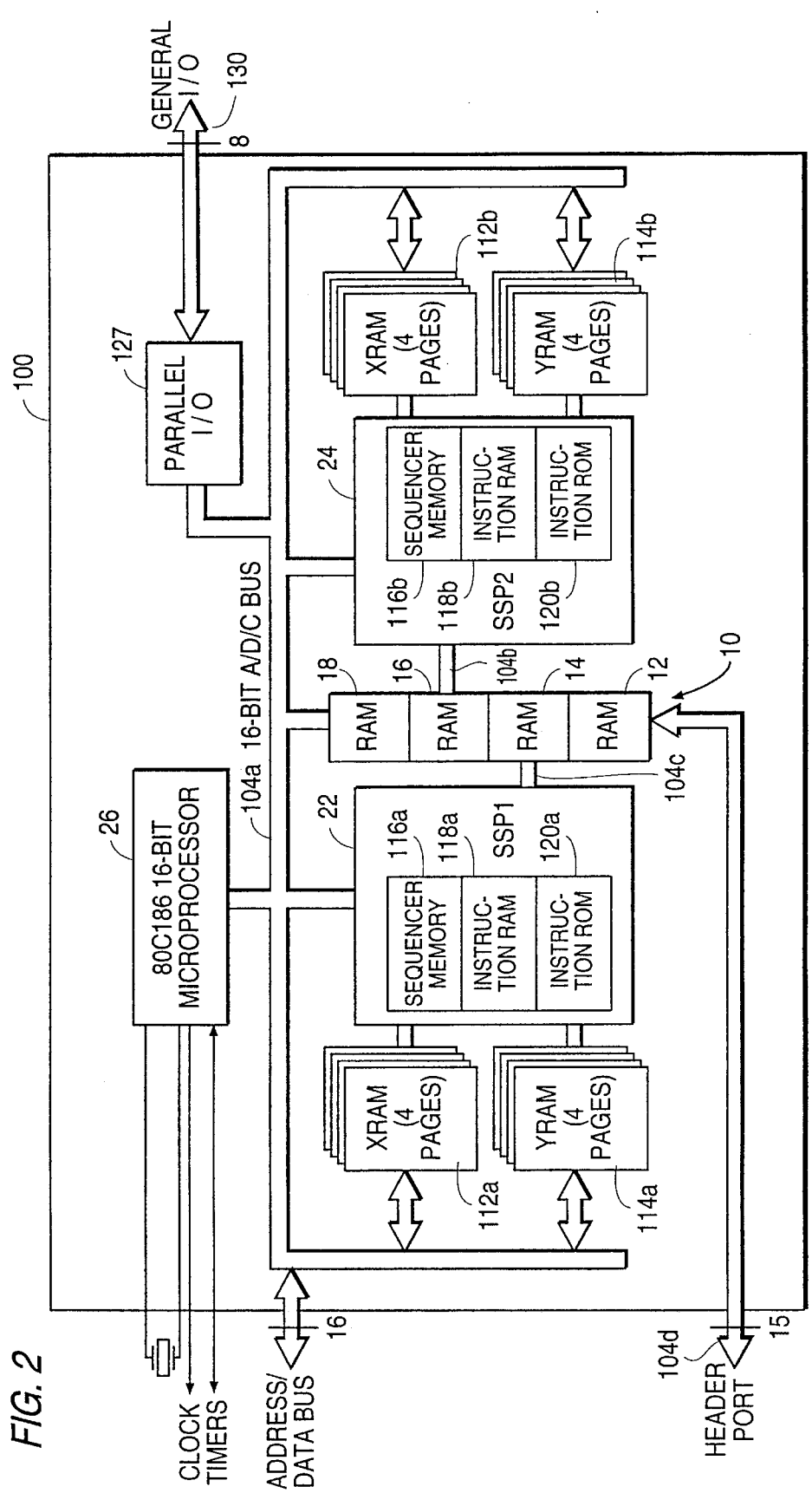
FIG. 2 is a detailed block diagram of a multi-processor system architecture with four processor devices utilizing the post office RAM for inter-processor communication.

FIG. 2 is a detailed block diagram of one embodiment of a multi-processor architecture utilizing a post office RAM for communication. A motion control or servo control architecture 100 incorporating a post office RAM 10 is shown generally in simplified block diagram format. In this embodiment there are four processor devices. The post office RAM 10 includes four mailboxes 12, 14, 16, 18. The four processor devices, including a master microprocessor 26, SSP1 22, SSP2 24, and an external device (not illustrated) can access the post office RAM 10.

The master microprocessor 26 is connected to its mailbox 18 over a first bus 104a. The master microprocessor 26 also provides address and data information to SSP1 22, SSP2 24 and the post office 10 over the first bus 104a.

The first bus 104a also may transmit control information. Additionally, the first bus 104a may interface with parallel I/O 127, which in turn communicates via a general I/O bus 130. In the embodiment illustrated, the first bus 104a is a 16-bit A/D/C bus.

SSP2 24 communicates with its mailbox 16 over a second bus 104b. SSP1 22 communicates with its mailbox 14 over a third bus 104c. The external device (not illustrated) communicates with its mailbox 12 via a header port on a fourth bus 104d.

Each of the streamlined signal processors 22, 24 may be a microprogrammable processor, including a sequencer memory 116a, 116b, an instruction memory RAM 118a, 118b, an instruction memory ROM 120a, 120b and an execution unit. It will be known to those of ordinary skill in the art that such an execution unit could include an arithmetic logic unit, registers and related processing devices. Such a microprogrammable processor could be programmed with microcode. Each of the streamlined signal processors 22, 24 performs programmed tasks. In the illustrated servo control architecture, the streamlined signal processors 22, 24 communicate with appropriate peripherals and perform tasks related to servo loop control.

FIG. 2 shows one example in which the post office RAM 10 is implemented as a plurality of contiguous RAM blocks. In this embodiment, there are four RAM blocks 12, 14, 16, 18. Each RAM block corresponds to a mailbox 12, 14, 16, 18. These four RAM blocks can be used for transferring information among the four processor devices in the system, the four processor devices being the microprocessor 26, SSP1 22, SSP2 24, and the external processor or controller connected to the header port. A first RAM block 18 is write-accessed by the microprocessor 26 through the bus 104a. SSP2 write-accesses a second RAM block 16 through a bus 104b. SSP1 write-accesses a third RAM block 14 through a bus 104c. The external processor connected to the header port accesses a fourth RAM block 12 through the bus 104d.

The architecture also includes X-addressable RAM (XRAM) 112a, 112b and Y-addressable RAM(YRAM) 114a, 114b. Each streamlined signal processor can access one of the XRAMs 112a, 112b, and YRAMs 114a, 114b. The master microprocessor 26 can also access the XRAMs 112a, 112b and YRAMs 114a, 114b via the first bus 104a.

Each RAM block 12, 14, 16, 18 may be written by its owner, that is, one of the processor devices 22, 24, 26 or the external processor 20. Thus the microprocessor 26 writes data to its RAM block 18, the streamlined signal processors 22, 24 write data to their RAM blocks 14, 16; and an external controller, such as an optical data channel controller, writes data to its RAM block 12. A processor device which is not the owner of the mailbox will not successfully write data to the corresponding RAM block. In this way, write arbitration is maintained without latency and overhead associated with typical bus arbitration logic.

All of the processor devices can read all of the RAM blocks 12, 14, 16, 18. This facilitates transfer of data from one processor device to another. To exchange information between processor devices, the processor device with the information to be transferred writes its data to its own RAM block. The transmitting processor then signals the receiving processor to read the transmitting processor's RAM block. Assume, for example, that information is to be exchanged between SSP1 22 and the microprocessor 26. SSP1 22 writes data to its RAM block 14 via the third bus 104c. Then SSP1 22 signals the microprocessor 26 to read SSP1's RAM block 14.

Specific methods of signalling in conjunction with use of the post office RAM will be described with reference to FIGS. 3–7. In order to communicate between two processor devices, the transmitting processor writes information into its mailbox in the post office RAM. The transmitting processor then signals the receiving processor. The receiving processor determines which processor signalled it, then reads the information in the transmitting processor's mailbox. The receiving processor then acts on the information. The exact signaling method depends on which processor device is signaling, and which processor device is being signaled.

Figure 3:
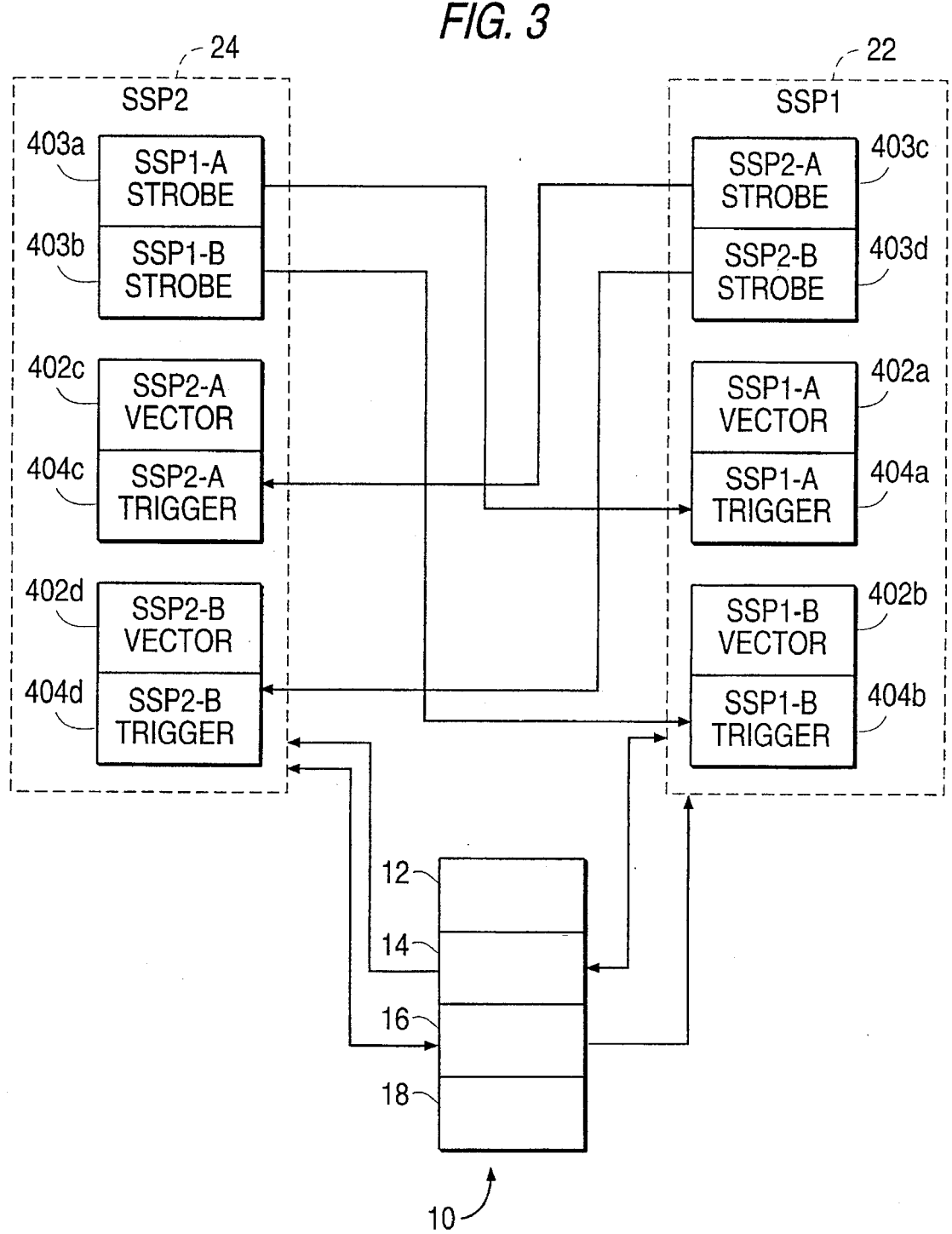
FIG. 3 is a block diagram illustrating communication between peer SSPs using a post office RAM.

Peer communication, illustrated in FIG. 3, refers to communication between similar processor devices (a peer). In the illustrated embodiment, peer communication occurs when the SSPs communicate with each other. Each peer has at least one vector register 402a–d and trigger 404a–d pair, which are used in signalling.

The vector register 402a–d preferably contains the start address of a subroutine. The subroutine preferably directs the processor device to read the mailbox 14, 16 in the post office RAM 10 which is owned by the other peer. The subroutine also directs the processor device to perform some task based on the information in the mailbox.

The triggers 404a–d informs the processor device that it should execute the subroutine pointed to by the corresponding vector register 402a–d. A plurality of vector register 402a–d and trigger 404a–d pairs can be used to specify a peer to address one of a plurality of subroutines.

The triggers 404a–d may be enabled by writing to a strobe location 403a having a unique address in a data space of the SSP 22, 24. To signal, the signalling SSP sets a latch by writing to the strobe's unique address in the data space. When the signaled SSP enters an idle state, it detects the latch. The signaled SSP then advantageously branches immediately to the subroutine which is pointed to by the corresponding vector register 402a–d. After the signaled SSP has read the appropriate mailbox and processed the mailbox's information (as directed by the subroutine), the signaled SSP may send an acknowledgement back to the signalling SSP to indicate that the mailbox has been processed. Alternatively, the signaled SSP may simply return to the idle state to await other triggers caused by other processor devices.

In the embodiment illustrated in FIG. 3, each SSP 22, 24 is provided with two pairs of asynchronous vector registers 402a–d and triggers 404a–d. The vector registers 402a–d and triggers 404a–d are used to direct the SSP to perform a task which is related to its peer SSP. Each of the two vector registers 402a–d (called SSP_A and SSP_B vector registers) is preferably programmed at power-up time with a start address of one of two subroutines that will be executed by the signaled SSP. The vector registers 402a–d may also be downloaded with the start address. The subroutines may contain microcode instructions which preferably direct the signaled SSP to read information from the appropriate mailbox, and subsequently to act on the information in the mailbox. An SSP signals its peer SSP to execute the subroutine pointed to by a vector register 402a–d by using its corresponding trigger 404a–d. Both trigger latches (called SSP_A and SSP_B triggers) are preferably cleared when the signaled SSP enters the idle state.

For example, SSP1 22 write-accesses its own mailbox 14, and writes some information to its mailbox 14. SSP1 22 signals SSP2 24 by way of a SSP1_A trigger 404a or a SSP1_B trigger 404b. When SSP2 24 is in the idle state, the SSP1_A trigger 404a causes SSP2 24 to execute a first subroutine pointed to by a SSP1_A vector register 402a. Similarly, the SSP1_B trigger 404b causes SSP2 24 to execute a second subroutine pointed to by a SSP1_B vector register 402b. Both subroutines cause SSP2 24 to read SSP1's mailbox 14.

Likewise, SSP2 24 writes information to its own mailbox 16. SSP2 24 signals SSP1 22 by way of a SSP2_A trigger 404c or a SSP2_B trigger 404d. When SSP1 22 is in the idle state, the SSP2_A trigger 404c causes SSP1 22 to execute a third subroutine pointed to by a SSP2_A vector register 402c. The SSP2_B trigger 404d causes SSP1 22 to execute a fourth subroutine pointed to by a SSP2_B vector register 402d. Both subroutines cause SSP1 22 to read SSP2's mailbox 16.

Figure 4:
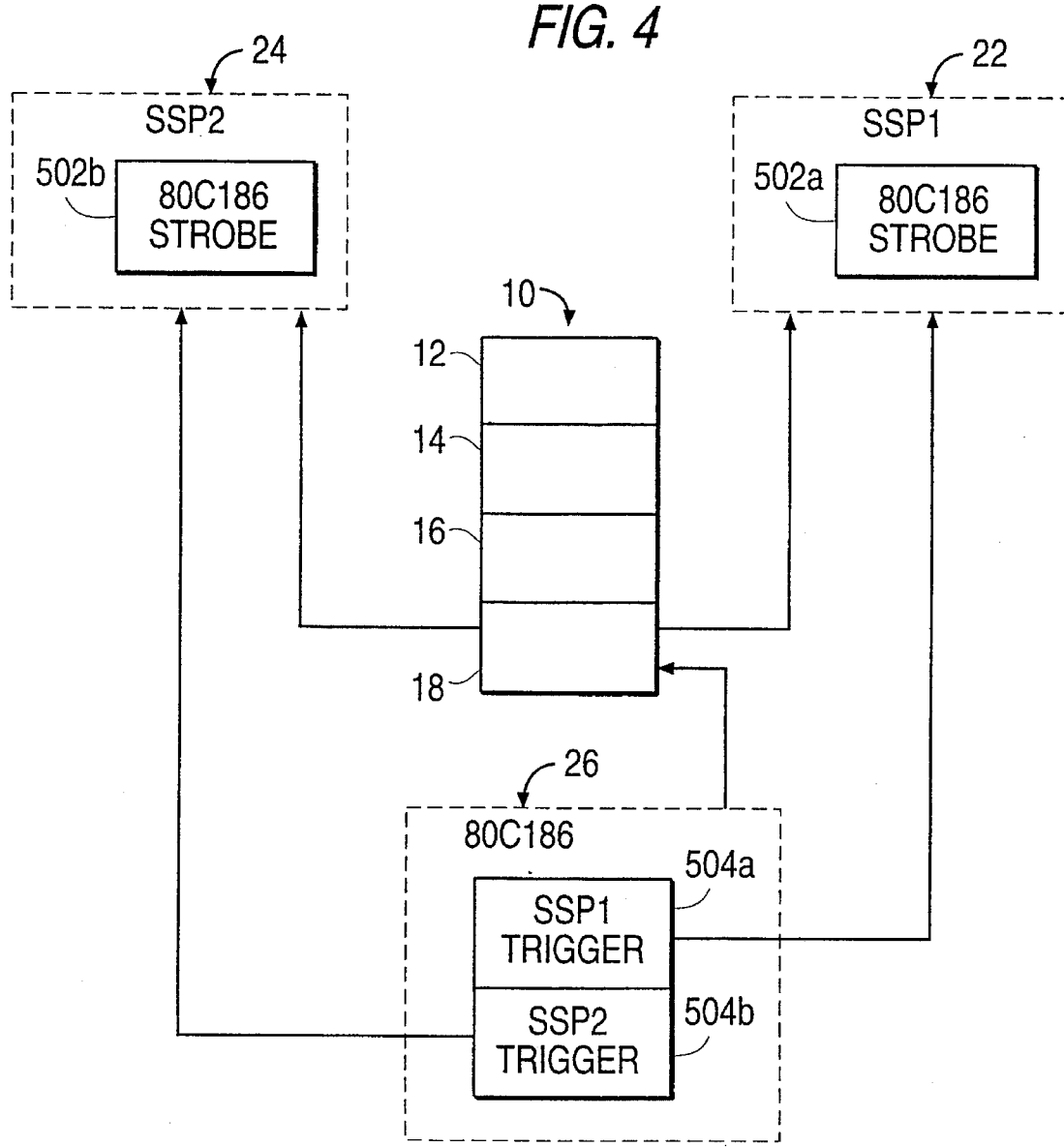
FIG. 4 is a block diagram illustrating communication from an 80C186 to an SSP.

FIG. 4 illustrates the master microprocessor communicating to one of the SSPs. The master microprocessor can communicate with the SSP in a manner similar to the above-described peer communication. That is, the master microprocessor can write to its own mailbox, and signal the SSP. The SSP can then read the master microprocessor's mailbox and act on the information.

In the illustrated embodiment, the master microprocessor is an 80C186 26. The 80C186 26 writes its mailbox 18 and signals an SSP 22, 24 to read the mailbox's contents. An 80C186 vector register 502 is provided for each SSP 22, 24, to allow the 80C186 26 to signal one of the SSPs 22, 24 to read the 80C186 mailbox 18.

A memory-mapped trigger 504 (called 80C186 trigger) is provided for each SSP 22, 24. The trigger 504 may be a trigger latch with a unique address, which is provided in a data space of the 80C186. To signal the SSP, an SSP's 80C186 trigger latch is preferably set by the 80C186 26 writing to the trigger latch's unique address. The trigger latch is preferably cleared when the SSP enters the Idle State.

Specifically, SSP1's 80C186 trigger latch 504a is set when the 80C186 26 writes to its unique address. Similarly, SSP2's 80C186 trigger latch 504b is set when the 80C186 26 writes to its unique address. When SSP1 22 is in the idle state, the presence of the SSP1 80C186 trigger latch 504a causes SSP1 22 to execute a subroutine pointed to by the corresponding SSP1 80C186 vector register 502a. When SSP2 24 is in the idle state, the presence of the SSP2 80C186 trigger latch 504b causes SSP2 24 to execute a second subroutine pointed to by the corresponding SSP2 80C186 vector register 502b.

Figure 5:
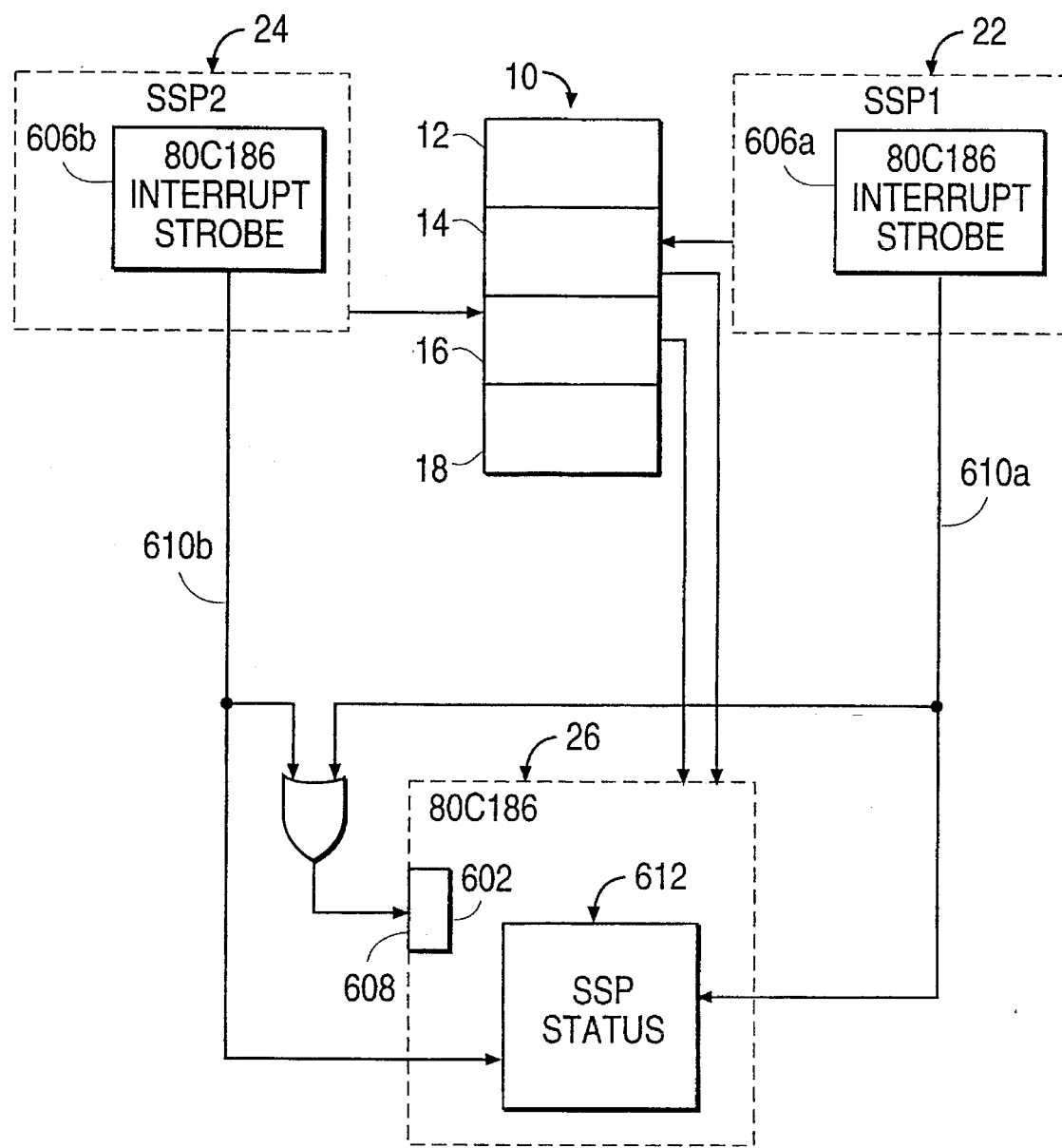
FIG. 5 is a block diagram illustrating communication from an SSP to an 80C186.

FIG. 5 illustrates SSP to master microprocessor communication. In the illustrated embodiment, SSP signaling to the 80C186 is slightly different from the above-described communication, due to the differences in architecture of the master microprocessor. Since the 80C186 processor is based on interrupts rather than triggers and vector registers, the SSPs preferably use interrupts as a way of signaling the 80C186 that the mailbox has been written.

Use of interrupts for communication may be as follows. One of the SSPs 22, 24 can generate an interrupt, and the master microprocessor can execute a subroutine which determines which SSP generated the interrupt. Next, the master microprocessor can read information in the mailbox owned by the SSP which generated the interrupt. Finally, the master microprocessor can act on the information which it read.

In the illustrated embodiment, an interrupt vector 602 and a corresponding interrupt service routine (ISR) is programmed into a program memory space of the 80C186 before the system is powered-up. The interrupt vector contains the address of the ISR. The program memory space is advantageously EPROM. An SSP generates an interrupt to the 80C186 in a similar way as it generates a trigger to its peer SSP. The interrupt is generated when the SSP simply writes to a memory-mapped latch 606a, 606b, called a 80C186 interrupt strobe 606. Outputs 610a, 610b of each the latches 606a, 606b from both SSPs are OR-ed together to drive a 80C186 INT1 interrupt input pin 608. In addition, the output 610a, 610b of each of these latches from both SSPs is connected to a bit in an SSP status register 612 in the master microprocessor 26. By reading the SSP status register 612, the 80C186 can determine which SSP caused the interrupt.

Therefore, the INT1 ISR preferably contains instructions which direct the 80C186 to first read the SSP status register 612 to determine which of the SSPs 22, 24 caused the interrupt, next to read the mailbox 14, 16 owned by the indicated SSP 22, 24, and subsequently, to act on that information. The instructions may be in Assembly Language. The 80C186 interrupt strobe latch 606a, 606b is preferably cleared when the 80C186 reads the SSP status register 612.

Figure 6:
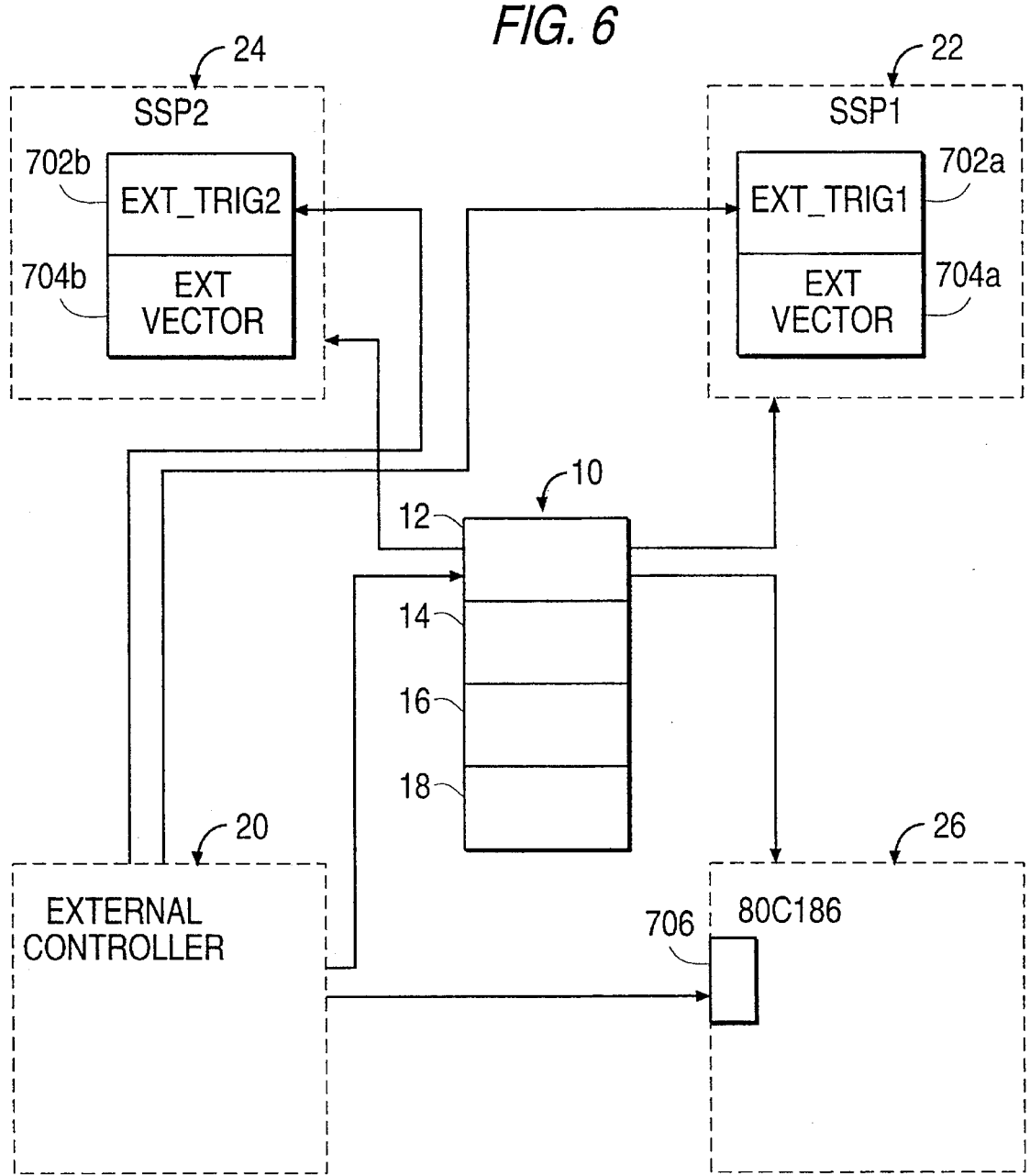
FIG. 6 is a block diagram illustrating communication from an external controller to an SSP and an 80C186.

FIG. 6 illustrates communication of the external controller to the SSPs and the master microprocessor. The external controller signals the SSPs by way of a vector register and trigger pair in a manner similar to the master microprocessor (80C186)-to-SSP signaling. An EXT_TRIG input pin is provided for each SSP. An external trigger latch 702 is set when the external controller pulses the EXT_TRIG input pin for that SSP. Specifically, the external controller writes information to its mailbox 12. An EXT_TRIG1 trigger 702a for SSP1 22 is set when the external controller pulses the EXT_TRIG1 input pin; and an EXT_TRIG2 trigger 702b for SSP2 24 is set when the external controller pulses the EXT_TRIG2 input pin. The vector register EXT vector 704a, 704b corresponding to the trigger 702a, 702b contains the address of a subroutine which is preferably executed by the SSP. The subroutine preferably reads the information in the external controller's mailbox 12, and acts on that information. The external trigger latch 702a, 702b for an SSP 22, 24 is cleared when the SSP 22, 24 enters the idle state.

The external controller can also communicate with the master microprocessor through the mailbox, as illustrated in FIG. 6. If the master microprocessor is an 80C186, it has a non-maskable interrupt (NMI) input pin 706. The external controller 20 signals the 80C186 26 directly via the 80C186 NMI input pin 706. An ISR is associated with the NMI. The NMI ISR contains instructions, preferably in Assembly Language, which preferably direct the 80C186 26 to read the information in the external controller mailbox 12, and subsequently to act on the information.

Figure 7:
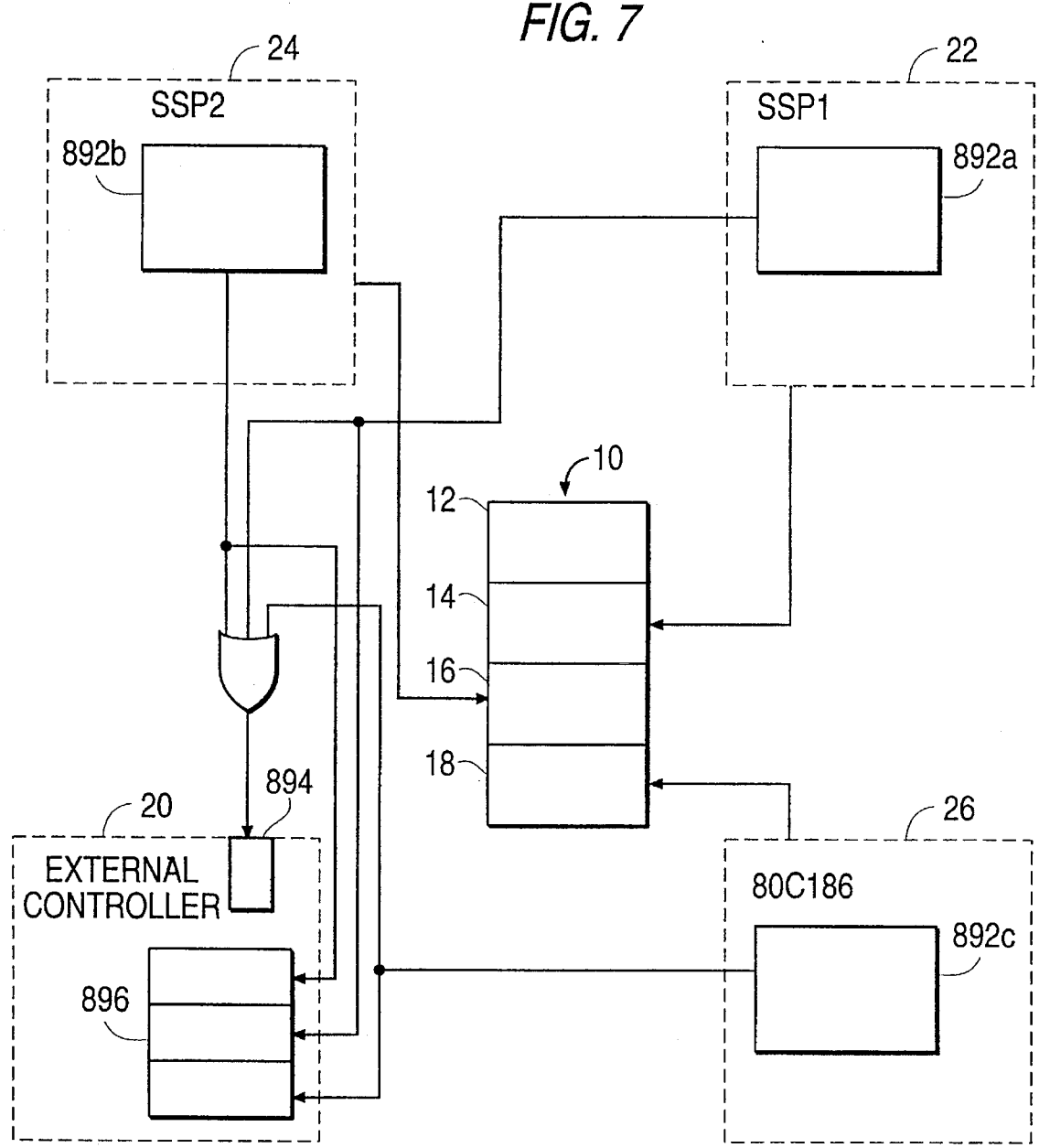
FIG. 7 is a block diagram illustrating communication from a mailbox to the external controller.
Figure 8A:
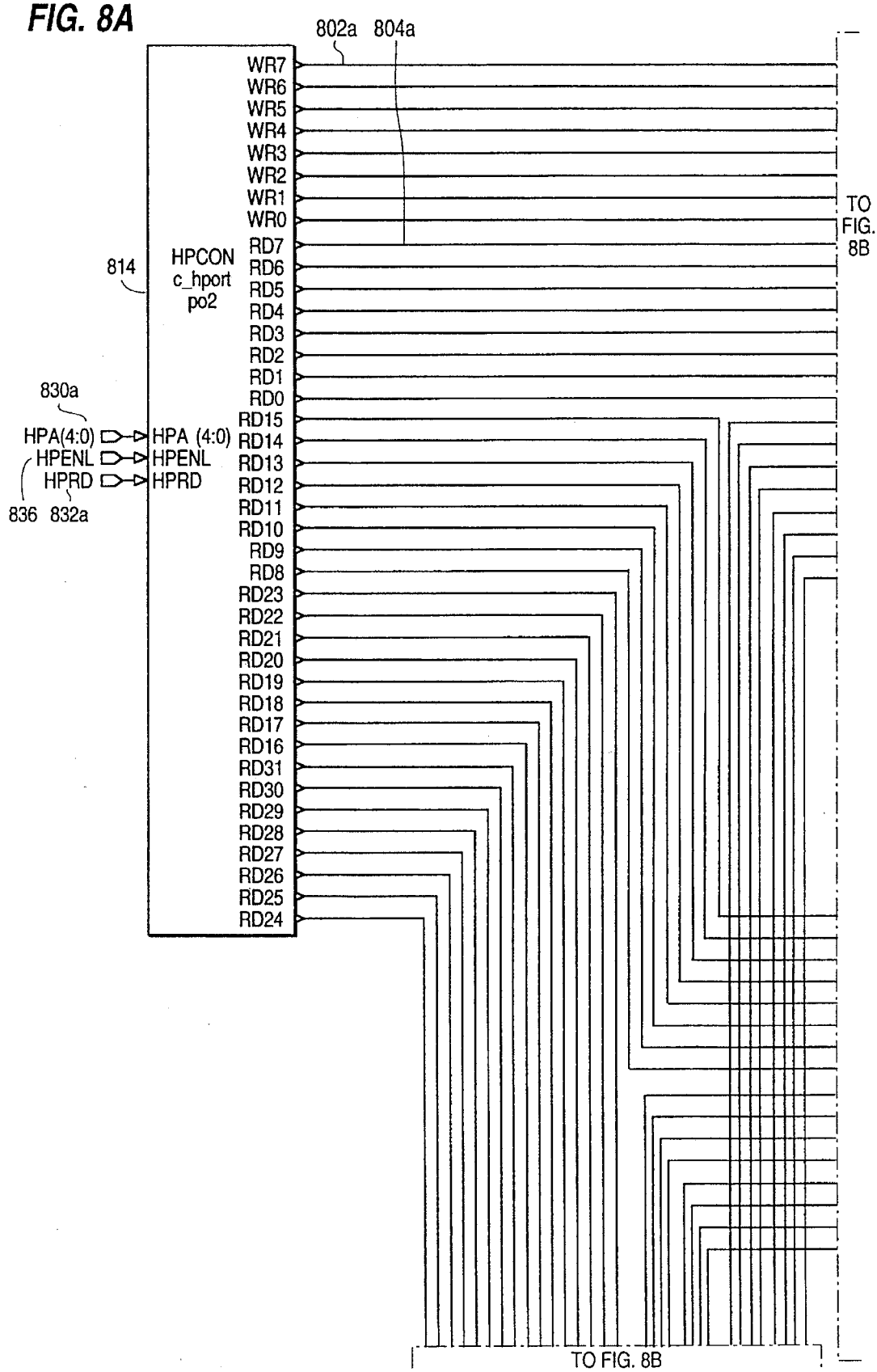
FIG. 8 shows one implementation of the post office RAM wherein each RAM cell is writable by one port and readable by all ports.
Figure 8B:
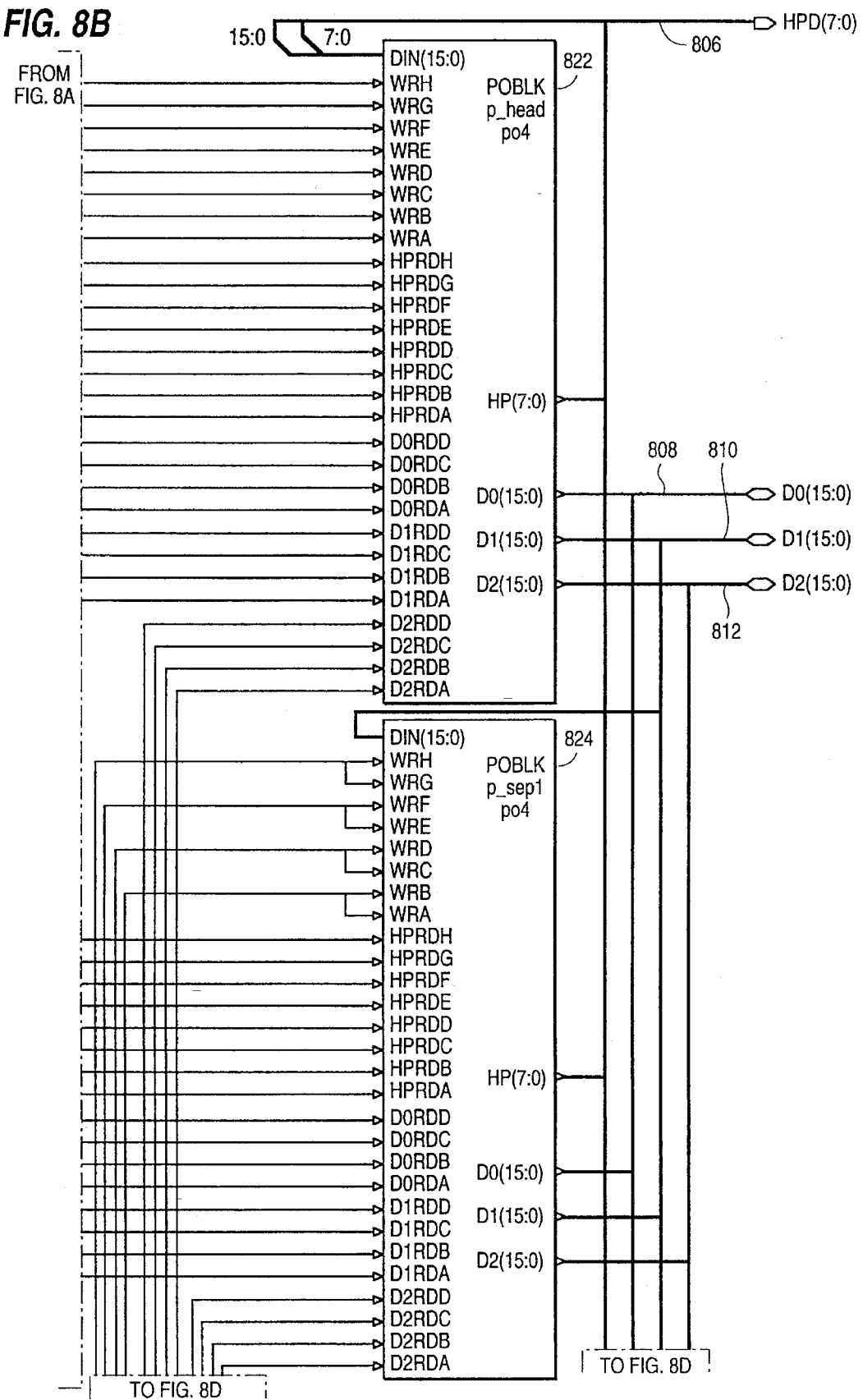
Figure 8C:
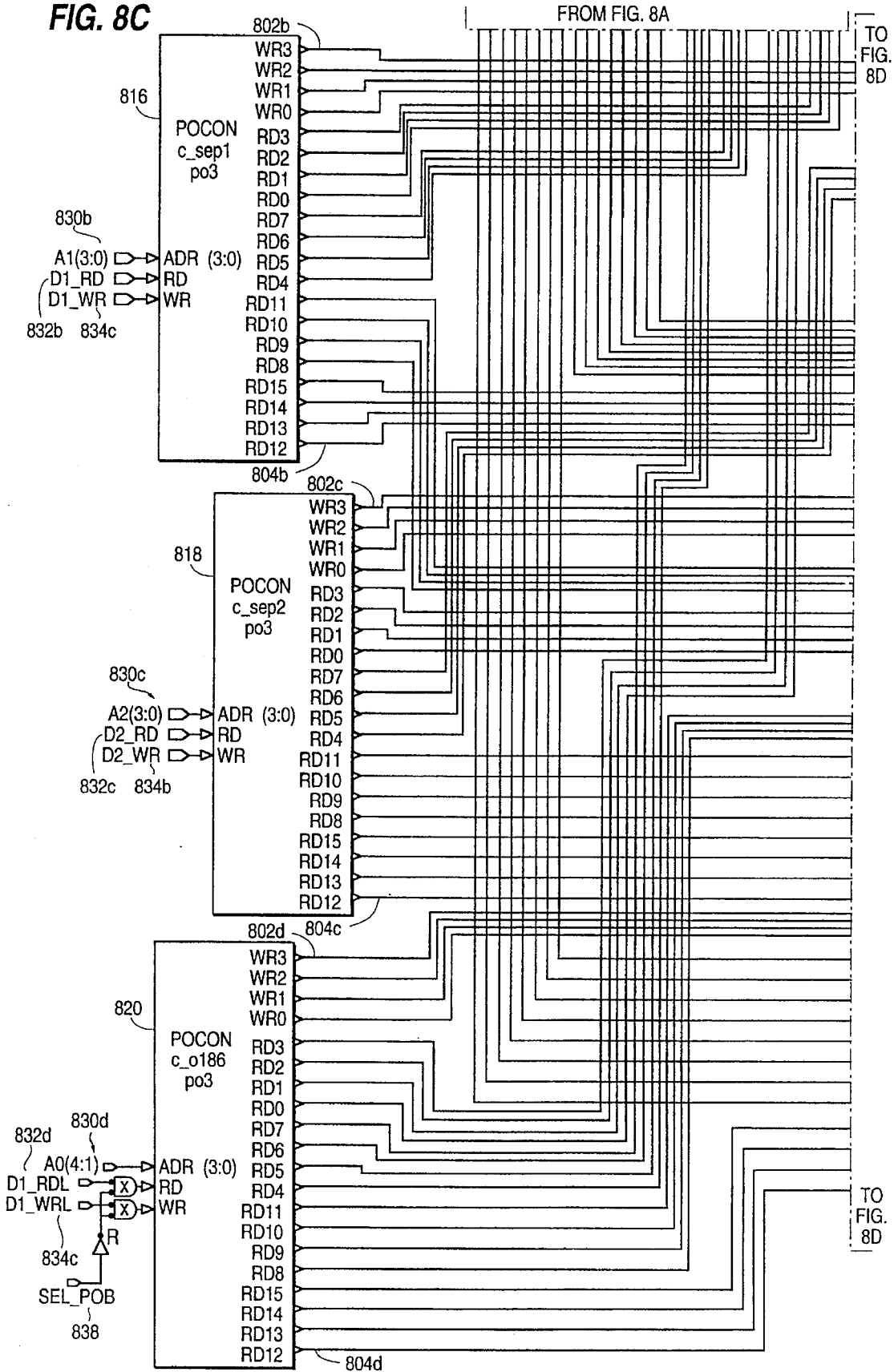
Figure 8D:
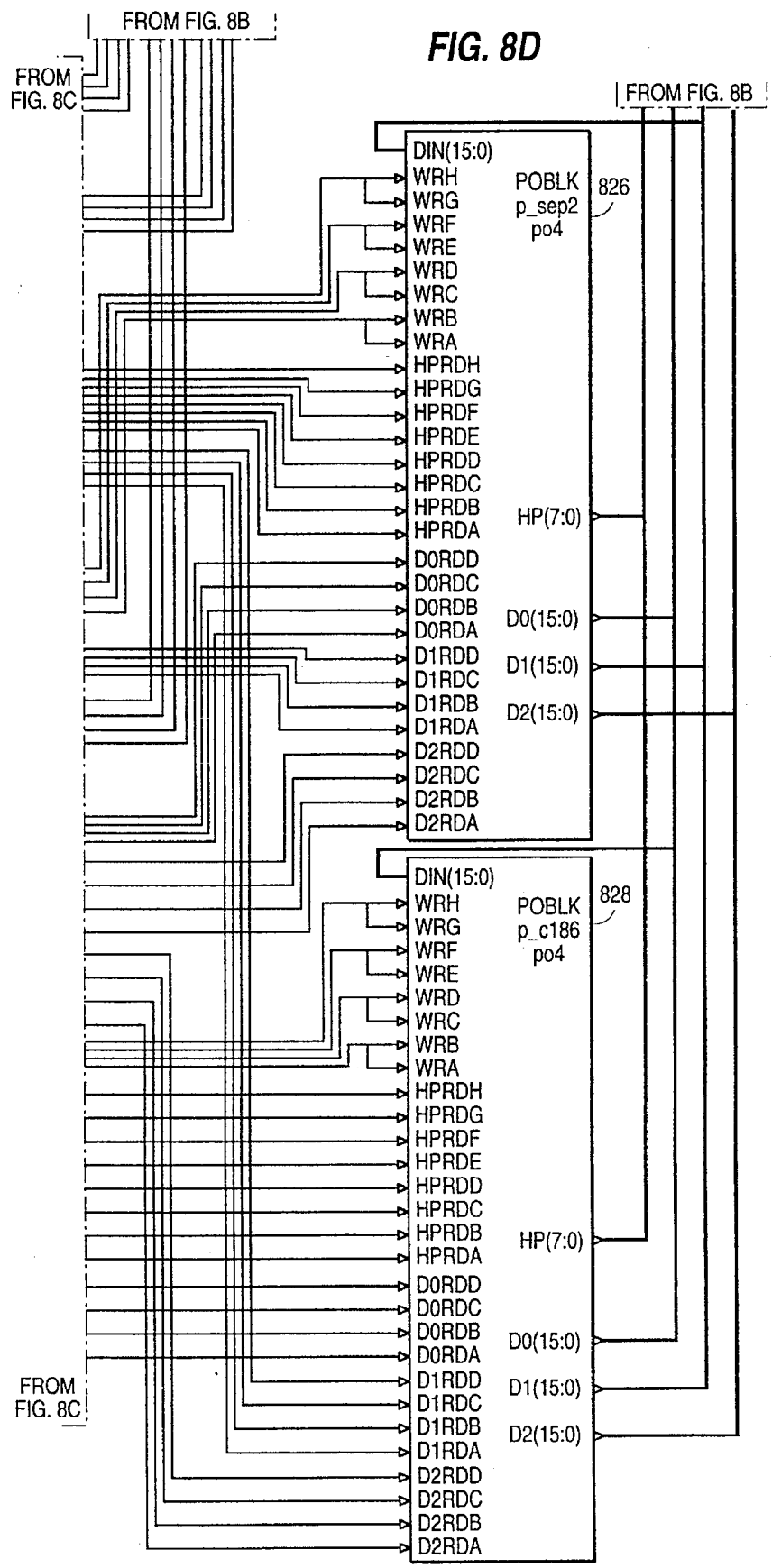

FIG. 7 illustrates mailbox signalling to the external controller. In the preferred embodiment, the architecture makes no provision for mailbox signaling to the external controller, since the controller never needs to read the mailboxes 12, 14, 16, 18 in the particular application. In any particular embodiment, generally, it is appropriate to make no provisions for communication between processor devices which never communicate.

Mailbox signalling to the external controller may optionally be provided as follows. The SSPs 22, 24 and 80C186 26 each have an additional memory-mapped trigger latch 892a, 892b, 892c for generating a trigger to the external controller 20. A trigger latch 892a, 892b, 892c is set when the processor device (SSP 22, 24 or 80C186 26) writes to the trigger latch's unique address in the processor's data space. The output of these three trigger latches 892a, 892b, 892c are OR-ed together to produce a single trigger 894 which is driven to the external controller via an external interrupt EXT_INT output pin.

In addition, each output of these three trigger latches is connected to one of three bits in mailbox status register 896. By reading the mailbox status register 896, the external controller 20 can determine which of the other processor devices 22, 24, 26 generated the trigger. The EXT_INT pin may be connected to an external interrupt pin on the external controller 20, or alternatively could be polled by the external controller 20 via an input port pin. In response to recognizing that the EXT_INT pin has been activated, the external controller 20 preferably executes a subroutine which instructs the external controller to first read the mailbox status register 806, next to read the information in the indicated processor's mailbox 14, 16, 18, and subsequently to act on that information.

Reference is now made to FIG. 8, showing a block diagram of one implementation of the post office RAM. The illustrated embodiment includes four blocks of memory in the post office (POBLK) 822, 824, 826, 828, for the external controller (p_head), SSP1 (p_ssp1), SSP2 (p_ssp2), and the master microprocessor (p_c186), respectively. Also included are four post office connections (POCON or HPCON) 814, 816, 818, 820, corresponding to the header port for the external controller (c_hport), SSP1 (c_ssp1), SSP2 (c_ssp2), and the master microprocessor (c_c186), respectively. These post office connections provide address information and read/write control for each port.

Each post office connection 814, 816, 818, 820 includes input address lines 830a–d, and a read line 832a–d. The header port connection 814 also includes an enable line 836. The master microprocessor connection 820 also includes a select line 838, which is connected to each of the read line 832d and write line 834c by a logical-AND connection. Each post office connection 814, 816, 818, 820 outputs a plurality of write lines (WR0, WR1, etc.) 802a, 802b, 802c and 802d and a plurality of read lines (RD0, RD1, etc.) 804a, 804b, 804c and 804d, respectively to post office blocks containing the data.

The output write lines 802a, 802b, 802c and 802d from each of the post office connections 814, 816, 818, 820 connect to the corresponding post office block 822, 824, 826, 828. Address lines 802a consists of eight write lines WR0–WR7, one write line for each of eight bytes. In the described embodiment, post office connection 814 accesses data on a byte wide basis. Address lines 802b, 802c and 802d consist of 4 write lines. Each write line accesses two bytes of data. Post office connection 816, 818 and 820 access data on a word wide basis in the described embodiment, thus the difference in the number of write lines between the post office connections in the described embodiment.

A plurality of the read lines 804a, 804b, 804c and 804d from each of the post office connections 814, 816, 818, 820, respectively, connect to each block of post office block 822, 824, 826, 828. In this implementation, thirty two read lines 804a output from the header port connection, one for each of the thirty two bytes in the described embodiment. Thus, eight read lines are connected from the header port to each post office block 822, 824 826 and 828. The other ports 816, 818 and 820 output sixteen address lines 802b, 802c and 802d, four output read lines being input to each post office block. Each post office block 822,824,826,828 further includes data input/output lines (HPD, D0, D1, D2) 806, 808, 810, 812. HPD contains 16 bits of data and the remaining data I/O lines are 16 bits for each port. Potential write collisions are avoided since only one port has write access to its mailbox.

Figure 9:
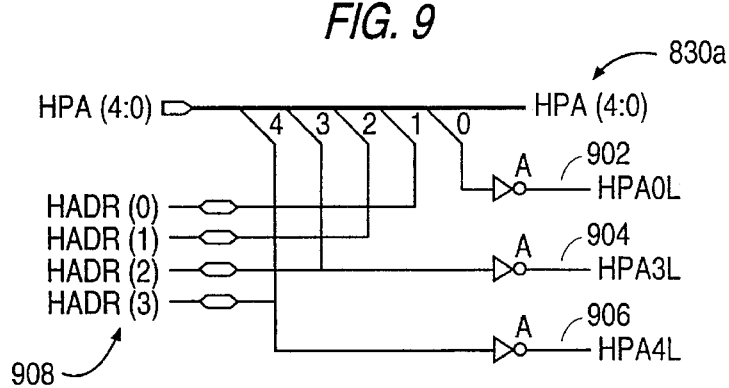
FIG. 9 is a circuit diagram of the header port address of FIG. 8.

FIG. 9 illustrates the header port address (HPA) 830a of FIG. 8. As illustrated, the HPA includes five bits (4:0). The zeroth, third and fourth bits of the HPA are inverted as HPA0L 902, HPA3L 904, and HPA4L 906, respectively. The first four bits are used as a header address (HDR) 908.

Figure 10:
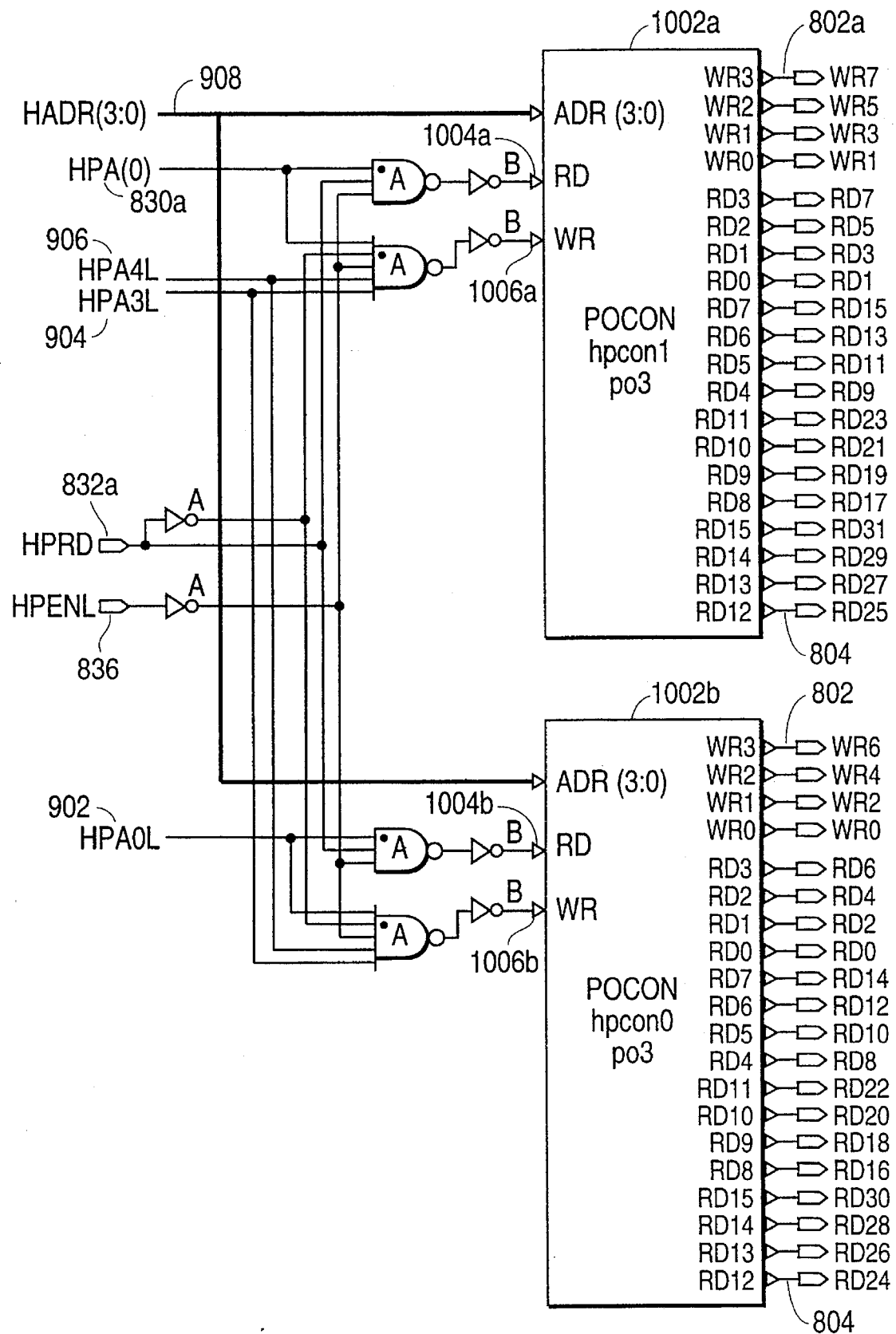
FIG. 10 is a circuit diagram of the header port connection of FIG. 8.

FIG. 10 illustrates the header port connection. Included are two post office connections POCON (hpcon0, hpcon1) 1002a,b. The HDR 908 is input as an address into each POCON. The first bit of the HPA 830a, the HPRD 832a, and an inverted HPENL 836 are combined by a logical-NAND, and inverted, to obtain a read input 1004a to one POCON 1002a. Similarly, the HPAOL 902, the HPRD 832a, and the inverted HPENL 836 are combined by a logical-NAND, and inverted, to obtain the read input 1004b to the other POCON 1002b. The first bit of the HPA 830a, HP3L 904, HP4L 906, an inverted HPRD 832a, and the inverted HPENL 836 are combined by a logical-NAND, and inverted, to obtain a write input 1006a to one POCON 1002a. Similarly, HPAOL 902, HP3L 904, HP4L 906, the inverted HPRD 832a, and inverted HPENL 836 are combined by a logical-NAND, and inverted, to obtain the write input 1006b to the other POCON 1002b. Write inputs 1006a and 1006b are inactive if HPRD 832a is active. Additionally, the logic is structured so that POCON 1002a addresses odd addresses and POCON 1002b addresses even addresses. Each POCON 1002a,b has a plurality of output write lines (WR0–WR3) 802 and a plurality of input read lines (RD0–RD15) 804.

Figure 11:
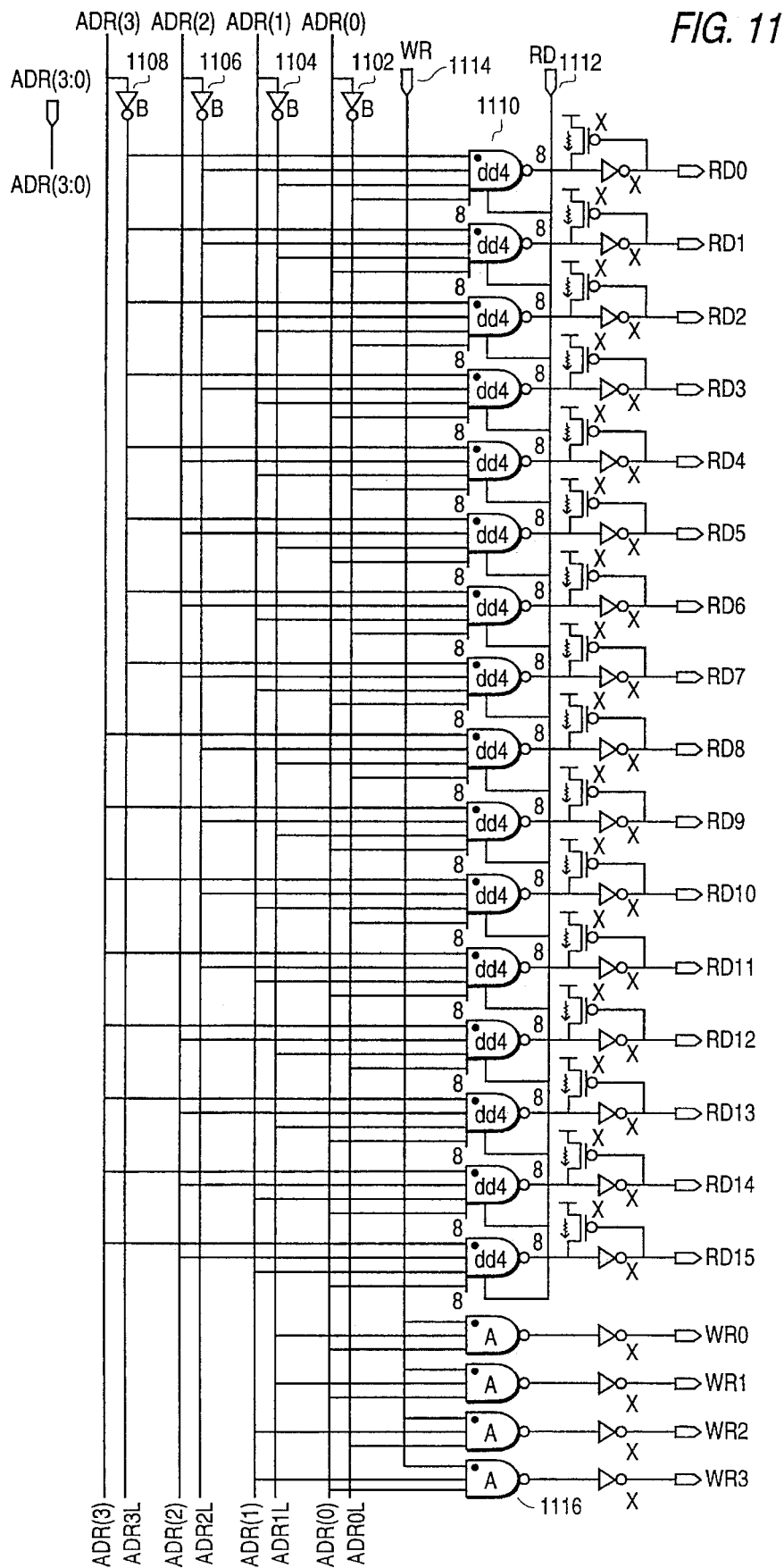
FIG. 11 is a circuit diagram of the POCON of FIG. 10.

FIG. 11 provides further detail of the structure of the post office connections 816, 818, 820, 1002a, 1002b. The input address lines ADR(3:0) 830b–d or HADR(3:0) 908 are decoded as shown in FIG. 11 to provide RD0–RD15 outputs (corresponding to the read addresses 804 in FIG. 8). Thus, for example, the complement of bits ADR(0)–ADR(3), 1102, 1110, 1106 and 1108 are combined by a logical-NAND 1104, which is gated by RD line 1112, to provide RD0. Additionally, bits ADR(0), ADR(1) and their complement are combined with the write input line 1114 (corresponding to 834a–c, 1006a, 1006b) via a logical-NANDs 1116, and inverted, to obtain four output write lines (WR0–WR3) 802.

Figure 12:
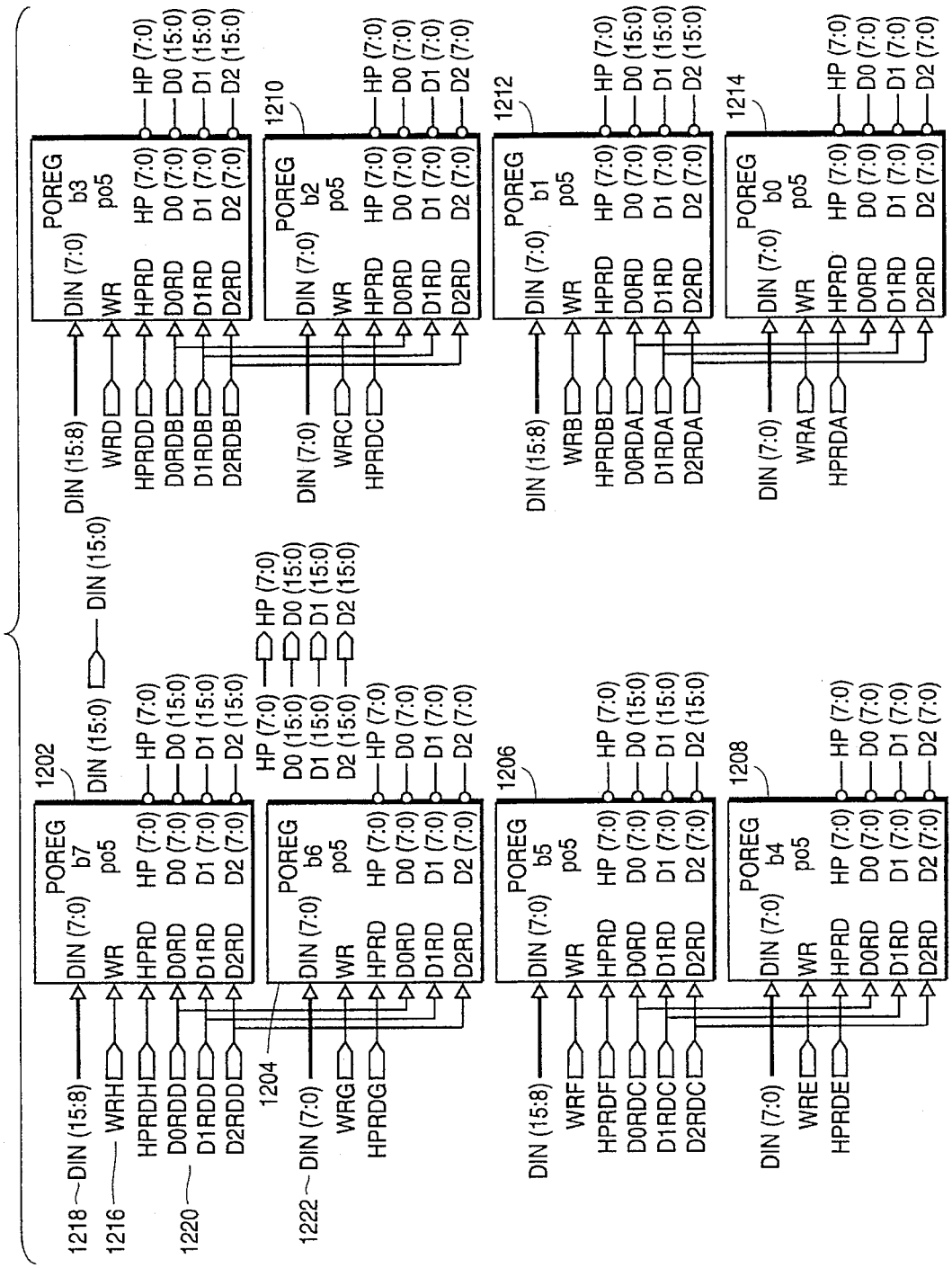
FIG. 12 is a circuit diagram of the post office block of FIG. 8.

FIG. 12 is a more detailed view of post office block 822. Each post office block includes 8 identically configured register blocks 1202, 1204, 1206, 1208, 1210, 1213 and 1214. Each register block 1202–1214 stores an 8 bit byte of data. Each block receives a single write (WR) signal 1216 and 8 bits of data 1218. Additionally, each register block receives read address lines 1220 from each of the four post office connections (POCON or HPCON) 814, 816, 818, 820. The high order data bits (15:8) 1218 go into block 1202 and the low order bits (7:0) 1222 are sent into block 1204. Note that HPCON sends and receives byte wide data while each of the POCONs can send and receive data on a 2 byte (16 bit) basis. Thus, the two blocks 1202 and 1204 combined provide a 16 bit data word. Each register block receives a unique write line from the header port (since this is the header port post office) and each read line from the other ports are directed to two register blocks to access two byte data.

Figure 13:
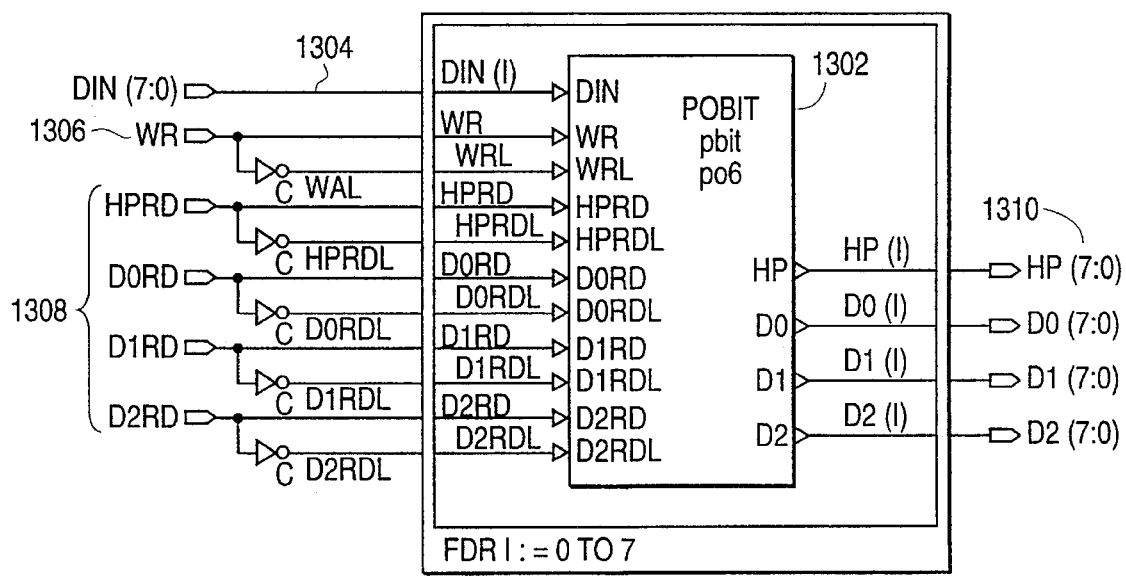
FIG. 13 is a circuit diagram of the post office register of FIG. 12.

FIG. 13 is a block diagram for each post office bit shown in FIG. 12. Eight post office bits 1302 are used for each post office block 1202–1214. Each bit receives a data bit (DIN (I)) 1304, a write line 1306, and read address lines 1308. Four data outputs 1310 are provided from each post office bit to each of the four ports.

Figure 14:
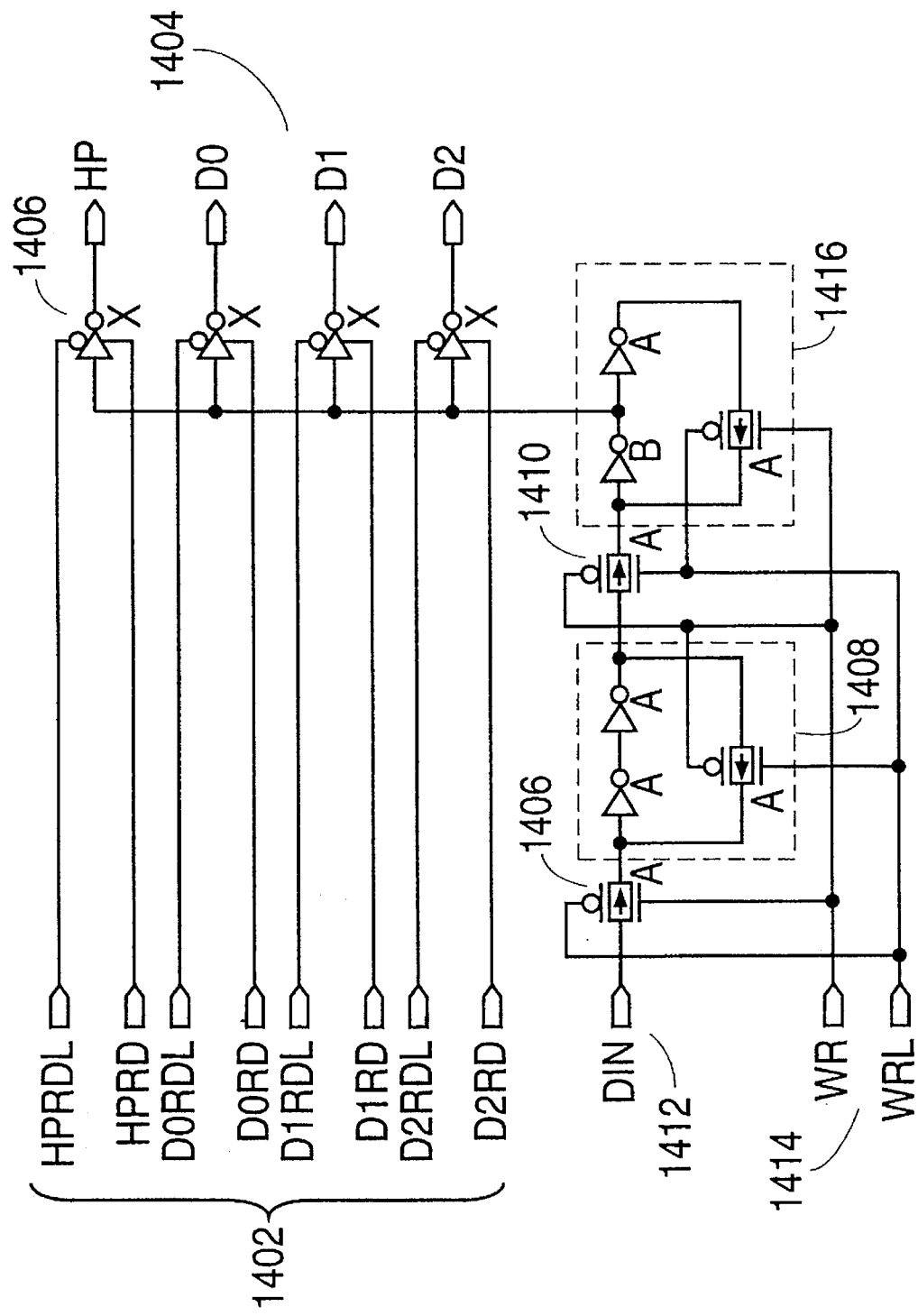
FIG. 14 is a circuit diagram of the post office bit of FIG. 13.

FIG. 14 shows an implementation of the post office bit 1302. Each read address line (and their complement) 1402 are used to output data 1404 through the respective output buffers 1406. DIN 1412 is transmitted through a first gate 1406 when write is active, into a two inverter latch structure 1408. Latch 1408 stores the data when the write line WR 1414 is deactivated. Gate 1410 transmits the latched data when write is not active to buffers 1406 and latch 1416.

Latch 1416 stores data when write is active, thus preventing read access of data which is being written.

While specific embodiments of the invention have been described and illustrated, it will be clear that variations in the details of the embodiments specifically illustrated and described may be made without departing from the true spirit and scope of the invention as defined in the appended claims.

What is claimed is:

1. An apparatus for communication between a plurality of processor devices, comprising:

a post office memory including a plurality of mailbox memories;

each of the mailbox memories being write accessible at any time only by a corresponding owner processor device, and read-accessible by the corresponding owner processor device and other processor devices of the plurality of processor devices at times determined independently of a write access;

the plurality of processor devices including a transmitting processor device and a receiving processor device;

a mailbox memory corresponding to the transmitting processor device containing information to be transferred to the receiving processor device; and the transmitting processor device being determined prior to the receiving processor device reading the information to be transferred.

2. An apparatus as in claim 1, wherein:

a signal line provides communication between the processor devices; and a subroutine in the receiving processor device, corresponding to the signal line, reads the mailbox memory corresponding to the transmitting processor device.

3. An apparatus as in claim 2, wherein the signal line is a trigger, and further comprising a vector register pointing to the subroutine.

4. An apparatus as in claim 3, wherein the plurality of processor devices comprises at least three processor devices, including at least two transmitting processor devices and at least one receiving processor device, and a signal line between the receiving processor device and each of the transmitting processor devices, further comprising:

(a) an OR gate producing a logical-OR of the signal lines; and (b) a mailbox status register associated with the receiving processor device, each of the signal lines setting a status of one of the transmitting processor devices in the mailbox status register.

5. An apparatus as in claim 3, having at least three processor devices, including at least two transmitting processor devices and at least one receiving processor device, and a signal line between the receiving processor device and each of the transmitting processor devices, further comprising:

(a) an OR gate producing a logical-OR of the signal lines;

(b) a mailbox status register associated with the receiving processor device, each of the signal lines setting a status of one of the transmitting processors in the mailbox status register.

6. An apparatus as in claim 2, wherein at least one of the processor devices is external to a chip, and the other processor devices are on the chip.

7. An apparatus as in claim 6, wherein at least two of the processor devices on the chip are streamlined signal processors, and one of the processor devices on the chip is a master microprocessor.

8. An apparatus as in claim 2, wherein the signal line is an interrupt, and wherein the subroutine is an interrupt service routine addressed by the interrupt.

9. An apparatus as in claim 1, wherein the post office memory is a multi-port random access memory (RAM), and each of the mailbox memories is a predetermined area of the RAM;

each predetermined area of the RAM further comprising means for providing write-access for only one of the processor devices to the predetermined area of the RAM from one port of the RAM; and means for providing read-access to the RAM for the processor devices from each port of the RAM.

10. An apparatus as in claim 9, wherein the multi-port RAM comprises a 4-port RAM.

11. An apparatus as in claim 10, wherein each predetermined area of RAM comprises 8 bytes.

12. An apparatus as in claim 1, further comprising:

a plurality of ports corresponding to the plurality of processor devices; and wherein each of the mailbox memories comprises, a plurality of register blocks, each of the register blocks including,
storage for a predetermined number of data bits,
a single data-in bus connection,
a plurality of data-out bus connections, one data-out bus connection for each of the plurality of ports,
a plurality of read input lines, one read input line from each of the plurality of ports, and
a single write line, the write line coming from the port corresponding to the owner processor device.

13. A method of communicating among a plurality of processor devices, including a transmitting processor device and a receiving processor device, utilizing a post office with a plurality of mailboxes, the method comprising the steps of:

writing information to be transferred from a transmitting processor device to a receiving processor device into a predetermined one of the mailboxes in the post office at any time determined by the transmitting processor device;

signaling the receiving processor device with the transmitting processor device;

determining in the receiving processor device, prior to the receiving processor reading the information, which of the processor devices signalled the receiving processor device; and reading the information from the predetermined mailbox with the receiving processor device an a time determined by the receiving processor.

14. The method of claim 13, wherein the signalling step comprises the transmitting processor device issuing an interrupt to the receiving processor device.

15. The method of claim 14, the determining step including the receiving processor device executing an interrupt subroutine corresponding to the interrupt, and the reading step being performed by the interrupt subroutine.

16. The method of claim 15, further comprising the step of the transmitting processor device setting a status register indicating the transmitting processor device, and the determining step comprising the receiving processor device reading the status register to determine the transmitting processor device.

17. The method of claim 13, wherein the signalling step comprises the transmitting processor device issuing a trigger to the receiving processor device.

18. The method of claim 17, the determining step including executing a subroutine pointed at in a vector register corresponding to the trigger, and the reading step being performed by the subroutine.

19. The method of claim 18, further comprising the step of the transmitting processor device setting a mailbox status register indicating the transmitting processor device, and the determining step comprising the receiving processor device reading the mailbox status register to determine the transmitting processor device.

20. The method of claim 13, further comprising the step of the receiving processor device acting on the information.

21. The method of claim 13, wherein the writing step occurs via a first port which is reserved to the transmitting processor device.

22. A method of bi-directional communication between at least two processor devices, utilizing a post office RAM with a plurality of mailboxes, the method comprising the steps of:

writing information to be transferred from a first processor device to a second processor device into a first mailbox in the post office RAM, and signaling the second processor device with the first processor device;

writing information to be transferred from the second processor device to a first processor device into a second mailbox in the post office RAM, and signaling the first processor device with the second processor device;

determining in the second processor device, prior to the second processor device reading the first mailbox, which of the processor devices signalled the second processor device;

determining in the first processor device, prior to the first processor device reading the second mailbox, which of the processor devices signalled the first processor device;

reading the information in the first mailbox with the second processor device; and reading the information in the second mailbox with the first processor device.

23. A post office RAM comprising:

a multi-port RAM, having a plurality of cells and a plurality of ports, any one of the RAM cells being read-accessible by the plurality of ports, and write-accessible by only one of the ports.

\* \* \* \* \*

(12) EX PARTE REEXAMINATION CERTIFICATE (10340th)

United States Patent
Feemster et al.

(10) Number: US 5,608,873 C1
(45) Certificate Issued: Oct. 20, 2014

(54) DEVICE AND METHOD FOR INTERPROCESSOR COMMUNICATION USING MAILBOXES OWNED BY PROCESSOR DEVICES

(75) Inventors: Ryan Feemster, Austin, TX (US); David Dettmer, Austin, TX (US)

(73) Assignee: Norman IP Holdings LLC, Tyler, TX (US)

Reexamination Request:
No. 90/012,785, Feb. 5, 2013

Reexamination Certificate for:
Patent No.: 5,608,873
Issued: Mar. 4, 1997
Appl. No.: 08/675,217
Filed: Jul. 3, 1996

Related U.S. Application Data

(63) Continuation of application No. 08/113,299, filed on Aug. 30, 1993, now abandoned.

(51) Int. Cl.
*G06F 15/16* (2006.01)

(52) U.S. Cl.
USPC .......................................... 709/214; 711/163

(58) Field of Classification Search
None
See application file for complete search history.

(56) References Cited

To view the complete listing of prior art documents cited during the proceeding for Reexamination Control Number 90/012,785, please refer to the USPTO's public Patent Application Information Retrieval (PAIR) system under the Display References tab.

*Primary Examiner* — Luke S Wassum

(57) ABSTRACT

A device and method for providing inter-processor communication in a multi-processor architecture. A post office RAM has a plurality of mailboxes. Each mailbox is write-accessible by one port, but is read-accessible by the other ports. Thus, a processor device on a port has write-access to one mailbox, but can read the other mailboxes in the post office. A transmitting processor communicates with a receiving processor, by utilizing the post office. The transmitting processor writes information into its own mailbox, and signals a receiving processor. The receiving processor determines which of the processor devices signalled it, and reads the information in the transmitting processor's mailbox.

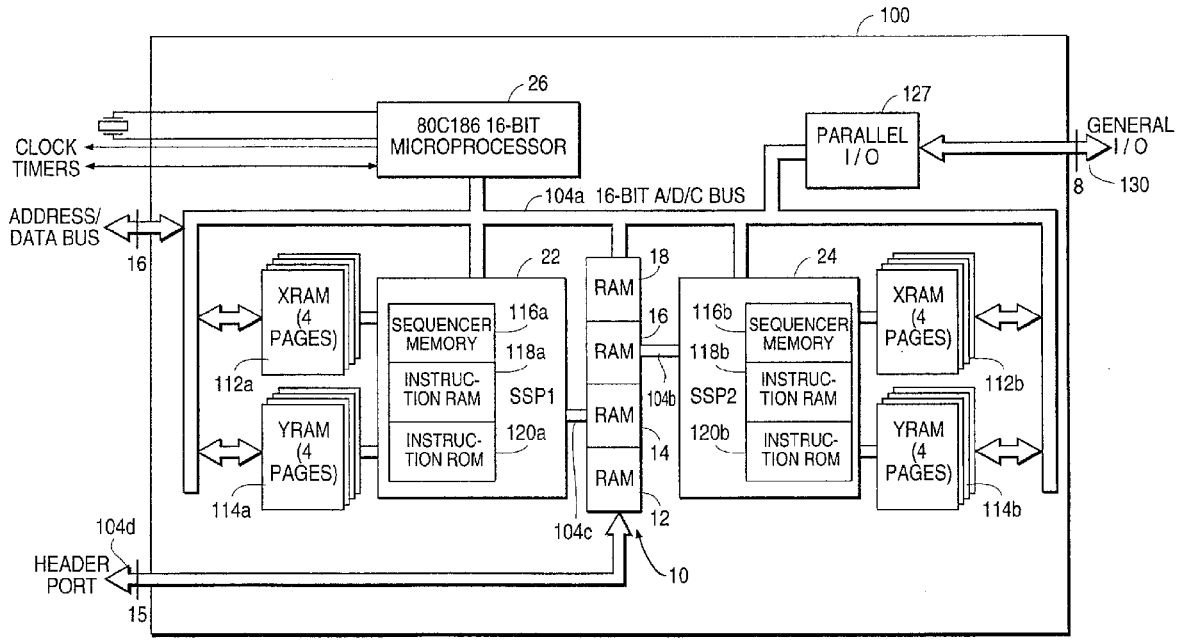

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 2, 8, 13-15 and 20 are cancelled.
Claims 3-7, 9-12, 16-19 and 21-23 were not reexamined.

\* \* \* \* \*